Patented Aug. 23, 1927.

1,639,724

UNITED STATES PATENT OFFICE.

CECIL JOHN TURRELL CRONSHAW AND WILLIAM JOHNSON SMITH NAUNTON, OF MANCHESTER, ENGLAND, ASSIGNORS TO BRITISH DYESTUFFS CORPORATION LIMITED, OF MANCHESTER, ENGLAND.

PROCESS FOR THE MANUFACTURE OF DIARYLGUANIDINES.

No Drawing. Application filed June 28, 1926, Serial No. 119,266, and in Great Britain July 4, 1925.

Diphenylguanidine has recently been manufactured in considerable quantities as an accelerator for use in the vulcanization of rubber. The manufacturing processes adopted consist in the desulphurizing of thiocarbanilide by various processes. A completely different laboratory process for the manufacture of this body has been known since 1848. This process consists in the treatment of aniline with cyanogen chloride, dry vapors of cyanogen chloride being aspirated through liquid aniline, with condensation of the cyan-anilide obtained to form diphenylguanidine; this being isolated in suitable ways from the more or less resinous mixture of products of reaction. The first description of this method was by Hoffmann in a paper read to the Chemical Society in June, 1848 (see the Quarterly Journal of the Chemical Society of the years 1849 and 1850, also Annalen der Chemie und Pharmacie (1848), vol. 67, page 129, and also Cahours and Cloëz Annalen, (1854), vol. 90, page 93). The processes described in these references can no doubt be readily carried out, using proper precautions, in the laboratory, but they are not suitable for the manufacture of the diarylguanidines on any large scale. It is not practicable on a large scale to pass vapors of cyanogen chloride or of cyanogen bromide through aniline, toluidine or the like. The reaction is so violent as to be almost explosive and is particularly dangerous in view of the poisonous nature of the cyanogen compounds employed. Further, in the said descriptions it is repeatedly recommended that dry, water-free material should be used. The presence of water is stated to exert a deterrent effect upon the condensation, giving low yields of the desired base, amongst other reasons because of the polymerization of the cyanogen chloride to cyanuric chloride. This view we have found to be incorrect. Water is not harmful and, on the other hand, the presence of liquid water is advantageous as aiding in the regulation of temperature and moderating the violence of the reaction. Polymerization of simple cyanogen chlorids to cyanuric chloride is likewise of no detriment.

The present invention avails itself of this known reaction between aniline or its homologues and cyanogen chloride or cyanogen bromide, but we have discovered conditions under which said reactions can be carried out on a manufacturing scale without undue danger. In particular the cyanogen halide is not used as gas or vapor, thereby simplifying the apparatus and avoiding danger to workmen. In our process, we work in the presence of water although water is not substantially a solvent for the cyanogen chloride and bromide, but in our method of working, the water does not exert an injurious effect, but it helps in the regulation of the temperature, which is important, and substantially quantitative yields are obtained.

Another feature of our process is that, as stated, we do not pass vapour of cyanogen chloride or of bromide through aniline or the like but on the contrary we run the aniline (for instance) slowly into a cold, violently agitated mixture of liquid cyanogen chloride and water. The stirring is continued whilst keeping the mixture cool till the production of the insoluble cyan-anilide is complete; then the temperature is raised to about 90° C. for about 4 hours, when a clear solution of diphenylguanidine hydrochloride is obtained. On running this clear solution into hot caustic soda solution, diphenylguanidine of high purity in substantially theoretical quantity is obtained.

It will be readily understood that instead of aniline, toluidine or other mono-amines of the benzene series can be used.

Cyanogen bromide can be used in the same way as the cyanogen chloride above described and being much less volatile than the chloride, its poisonous action is not so dangerous, and it is more easily handled and maintained in the liquid condition. Further, there is the advantage that the production of the cyanogen bromide and its reaction on analine or the like can be effected in the same vessel. It is not necessary to produce it elsewhere, purify it and then transfer it to the reaction vessel with the incident danger of handling. The presence of sodium or potassium bromide, the byproducts formed in making cyanogen bromide from solutions of potassium or sodium cyanide with bromine, is not injurious in the reaction of the present invention. For this purpose, in this embodiment of our invention, the requisite amount of bromine is placed in a closed pan and covered with water, and the whole cooled to a low temperature. The theoretical quantity of a soluble cyanide, such as sodium cyanide or potassium cyanide, in solution is then run slowly on to the mixture whilst thoroughly stirring. If the temperature is kept sufficiently low, the formation of solid cyanogen bromide can be observed. At the end of the addition of the alkali cyanide, the reaction mixture should have a faint yellow colour due to the presence of a little bromine. Whilst still maintaining thorough cooling conditions, the theoretical quantity of aniline or the like is run gradually into the violently stirred mixture and the stirring continued until the formation of cyan-anilide is observed; then the temperature is raised to 80–85° C. for about 3 hours or more, and the resulting clear solution is run into hot caustic soda solution.

We claim:—

1. In the manufacture of diphenylguanidine, the process which comprises treating aniline with liquid cyanogen-chloride in the presence of water, with cooling and violent agitation, and subsequently condensing the cyan-aniline so obtained to form diphenylguanidine by raising the temperature to 90° C.

2. In the manufacture of diphenylguanidine the process which comprises treating aniline with a cyanogen halide in the liquid state and in the presence of water, with cooling and violent agitation and subsequently condensing the cyan-anilide so obtained to form diphenylguanidine by raising the temperature to 80–85° C.

3. In the manufacture of diarylguanidines the process which comprises treating a mono-amine of the benzene series with a liquid cyanogen-chloride in the presence of water and condensing by heating the cyan-arylide so obtained to form a diarylguanidine.

4. The process of making diarylguanidines which comprises treating a mono-amine of the benzene series with a liquid cyanogen halide in the presence of water and condensing by heating the cyan-arylide so obtained to form a diarylguanidine.

In testimony whereof we have hereunto affixed our signatures.

CECIL JOHN TURRELL CRONSHAW.
WILLIAM JOHNSON SMITH NAUNTON.